(12) United States Patent
Miao

(10) Patent No.: US 6,595,728 B2
(45) Date of Patent: Jul. 22, 2003

(54) RIGID AND FRAGILE MATERIAL DRILLING MACHINE

(75) Inventor: Zhenghua Miao, No. 4 Building, Xuezhiyuan, 16 Xueqing Road, Haidian District, Beijing 100083 (CN)

(73) Assignees: Zhenghua Miao, Beijing (CH); Shuping Wang, Beijing (CH); Yibing Wang, Beijing (CH)

( * ) Notice: Subject to any disclaimer, the term of this patent is extended or adjusted under 35 U.S.C. 154(b) by 0 days.

(21) Appl. No.: 10/113,267

(22) Filed: Apr. 1, 2002

(65) Prior Publication Data

US 2002/0182019 A1 Dec. 5, 2002

(30) Foreign Application Priority Data

Jun. 1, 2001 (CN) ........................................ 01221345 U

(51) Int. Cl.$^7$ ............................ B23B 39/22; B23B 47/18
(52) U.S. Cl. ................................ 408/41; 74/25; 74/37; 74/89.17; 74/89.21; 408/37; 408/129; 408/135; 474/87; 474/148
(58) Field of Search ................................ 408/37, 40, 41, 408/31, 36, 39, 42, 51–53, 129, 135; 74/22 A, 25, 27, 29, 37, 89.17, 89.2, 89.21, 89.22, 665 G, 665 GE, 665 S; 451/194–195; 474/87–89, 148

(56) References Cited

U.S. PATENT DOCUMENTS 761,544 A * 5/1904 Rosenwald ................... 408/41
1,575,308 A * 3/1926 Alger et al. ................... 408/40
2,321,822 A * 6/1943 Kendis ........................ 408/40
2,620,687 A * 12/1952 Jones et al. ................... 408/40
2,703,994 A * 3/1955 Mezey ........................ 408/40
4,163,622 A * 8/1979 Akaba et al. ................. 408/41
4,573,835 A * 3/1986 Eckardt et al. ............... 408/37

* cited by examiner

Primary Examiner—Steven C. Bishop
(74) Attorney, Agent, or Firm—Ladas & Parry

(57) ABSTRACT

A rigid and fragile material drilling machine is provided, its driving means for driving the upper and lower drilling bit approximating the rigid and fragile material includes a control handle; upper and lower rear gears and associated upper and lower first synchronizing wheels, said upper and lower rear gears being engaged with each other; upper and lower first timing chains being wound around said upper and lower first synchronizing wheels and upper and lower second synchronizing wheels, respectively; upper and lower second timing chains being wound around said upper and lower third synchronizing wheels and upper and lower fourth synchronizing wheels, respectively; and drilling rod guiding sleeves, the gear racks thereof being engaged with said the upper and lower front gears, respectively. The rigid and fragile material drilling machine of the present invention, which is simplified in structure with a compact design and low cost, can be conveniently used wherever a power supply is available.

6 Claims, 2 Drawing Sheets

RIGID AND FRAGILE MATERIAL DRILLING MACHINE

Figure 1:
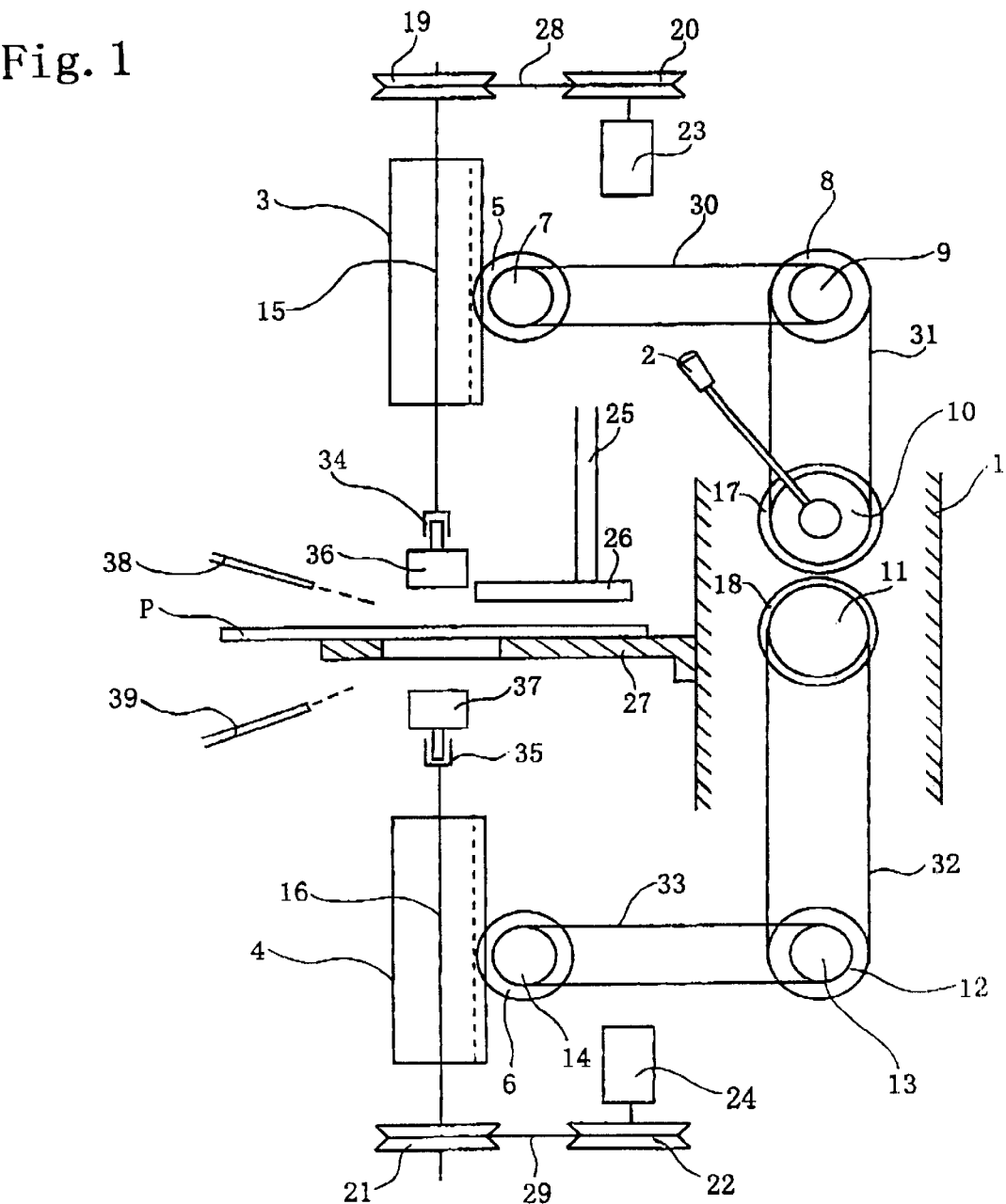

The present invention is related to a rigid and fragile material drilling machine. It is particularly suitable for the rigid and fragile material drilling machine according to the present invention to be used for drilling holes on rigid and fragile materials, such as glass, ceramic, crystal chip, etc.

In prior art, the rigid and fragile material drilling machines, such as a glass sheet drilling machine with diamond bit, have pneumatic means to transfer power or feed the drilling bits. In order to operate pneumatic cylinders, the conventional rigid and fragile material drilling machines can only be used in sites where compressed air sources are available. Moreover, in the pneumatic system of the conventional rigid and fragile material drilling machines, pressed gas pump, cylinders, gas pressure reducing valves, and safety valves, etc. have to be included, resulting in the conventional rigid and fragile material drilling machines being complex in structure, huge in volume, and expensive in manufacturing cost.

The object of the present invention is to provide a rigid and fragile material drilling machine, which can be conveniently used wherever a power supply is available.

Another object of the present invention is to provide a rigid and fragile material drilling machine, which is simplified in structure with a compact design and low cost.

In order to realize the objects mentioned above, a rigid and fragile material drilling machine is provided, comprising a driving means for driving the upper and lower drilling bit on opposite sides of the rigid and fragile material, which includes a control handle being able to be operated to turn around; upper and lower rear gears and associated upper and lower first synchronizing wheels, said upper and lower rear gears being coaxially connected to said associated upper and lower first synchronizing wheels, one of upper and lower first synchronizing wheels being driven to rotate by means of said control handle, said upper and lower rear gears being engaged with each other, and the radii of said upper and lower rear gears being greater than those of said upper and lower first synchronizing wheels; upper and lower second synchronizing wheels and upper and lower third synchronizing wheels, being provided above and below said upper and lower rear gears and associated upper and lower first synchronizing wheels, respectively, and said upper and lower second synchronizing wheels and said upper and lower third synchronizing wheels being coaxially connected with each other respectively; upper and lower first timing chains, being wound around said upper and lower first synchronizing wheels and upper and lower second synchronizing wheels, respectively; upper and lower fourth synchronizing wheels and upper and lower front gears, being provided on one side of said upper and lower second synchronizing wheels and said upper and lower third synchronizing wheels, said upper and lower fourth synchronizing wheels and upper and lower front gears being coaxially connected with each other, respectively, and the radii of said upper and lower fourth synchronizing wheels being less than those of said upper and lower front gears, respectively; upper and lower second timing chains, being wound around said upper and lower third synchronizing wheels and upper and lower fourth synchronizing wheels, respectively; and drilling rod guiding sleeves, the gear racks thereof being engaged with said the upper and lower front gears, respectively.

Preferably, said upper and lower second synchronizing wheels and said upper and lower third synchronizing wheels being provided upward and downward with respect to said upper and lower rear gears and associated upper and lower first synchronizing wheels, respectively.

Preferably, the axes of said upper and lower fourth synchronizing wheels and upper and lower front gears are provided at the same height as said upper and lower second synchronizing wheels and said upper and lower third synchronizing wheels.

Preferably, bearings are provided within said drilling rod guiding sleeves.

Preferably, the gear racks are integral with or fixed to said drilling rod guiding sleeves.

Preferably, the rigid and fragile material drilling machine is used for drilling holes on glass products.

In brief, the object of the present invention is realized in such a way that when turning the motor on, and rotating the control handle fixed on the machine body, as the gears, timing chain transmitting system and the racks are being driven, the two drilling rods holding the drilling bits are moved toward to each other with respect to the rigid and fragile material positioned on the table, so that the drilling bits can begin to drill holes on the rigid and fragile material.

Especially, the holding means for the table is manually operated by means of the rigid and fragile material positioning pad driving rod, and the driving means for driving the upper and lower drilling bits of the drilling machine is also manually operated by means of the control handle so as to approximate the rigid and fragile material. In addition, wherever the power supply is available, the drilling bits can be driven to rotate by the motor if turning the motor on. As a result, the rigid and fragile material drilling machine according to the present invention can be used in any places where the electric power is available.

As mentioned above, the pressed gas pump, cylinders, valves, etc. in the conventional rigid and fragile material drilling machines are not necessary to be included in the rigid and fragile material drilling machines according to the present invention, therefore, the rigid and fragile material drilling machines according to the present invention has the advantages of having a simple and compact structure, as well as a low cost.

Figure 2:
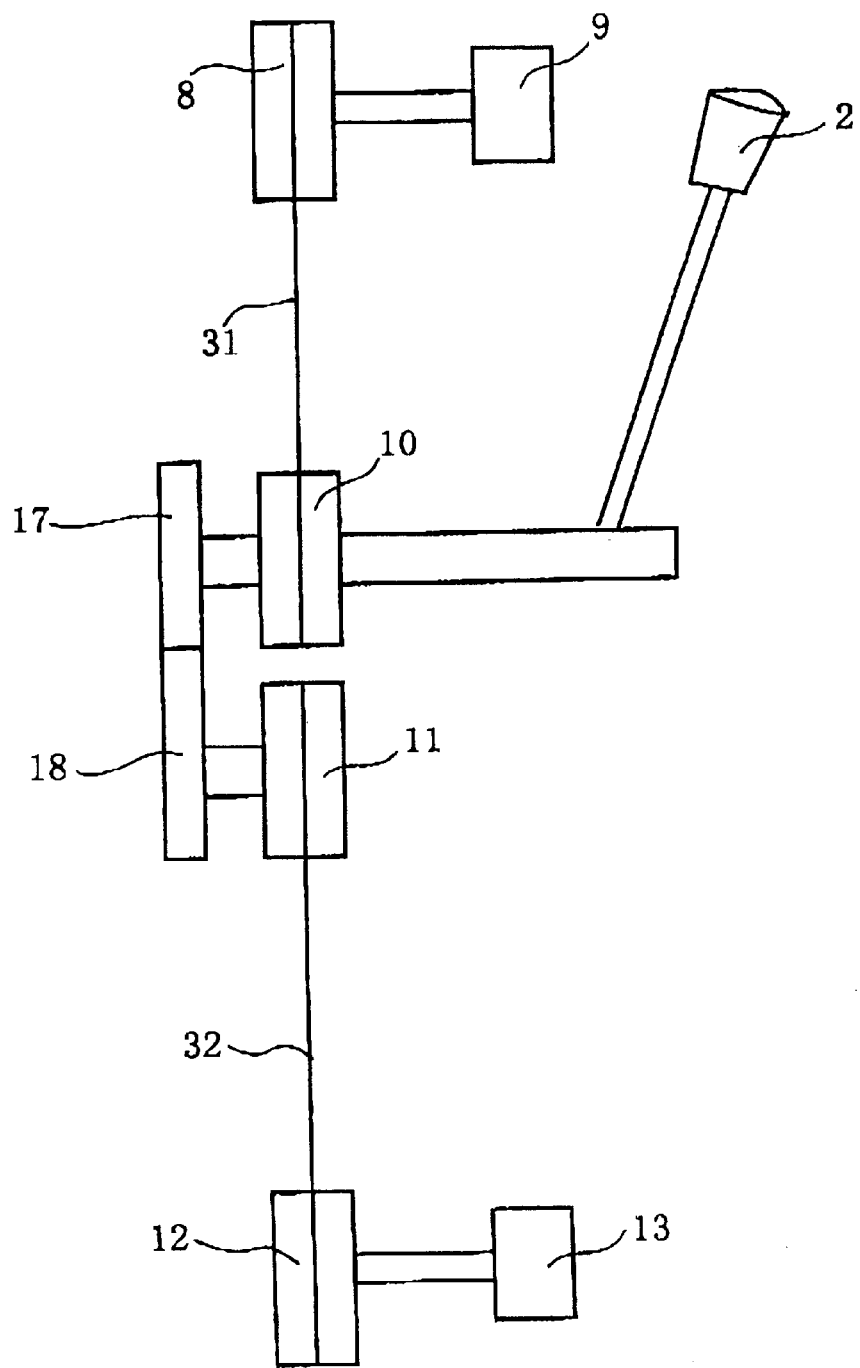

One preferred embodiment of the present invention will be explained in detail together with accompanying drawings, in which:

FIG. 1 is an overall schematic view of the rigid and fragile material drilling machines according to the present invention; and FIG. 2 is a schematic view of the transmitting system of thee rigid and fragile material drilling machines according to the present invention.

According to one preferred embodiment of the present invention, the rigid and fragile material drilling machine is a machine for drilling glass sheet with diamond bit. As shown in FIGS. 1 and 2, the machine for drilling glass sheet with diamond bit includes a machine body 1, drilling rod guiding sleeves 3 and 4 which are provided with gear racks respectively, front gears 5 and 6, synchronizing wheels 7, 8, 9, 10, 11, 12, 13 and 14; drilling rods 15 and 16, rear gears 17 and 18, belt pulleys 19, 20, 21 and 22, motors 23 and 24, a glass positioning pad driving rod 25, a glass positioning pad 26, a table 27, driving belts 28 and 29, timing chains 30, 31, 32 and 33, drilling bit holders 34 and 35, diamond glass drilling bits 36 and 37, and cooling liquid supplying means 38 and 39.

The drilling rods 15 and 16 are installed within the drilling rod gliding sleeves 3 and 4 with gear rack via bearings, respectively. The motors 23 and 24 drive the drilling rods 15 and 16 to rotate via driving belts 28 and 29, respectively. The drilling bit holders 34 and 35 which are provided at each end of the driving rods are used to hold diamond glass drilling bits 36 and 37, respectively. The front gears 5 and 6 are in engagement with the gear racks of the drilling rod guiding sleeves, so as to drive the drilling rod guiding sleeves to move upward or downward together with the drilling rods 15 and 16.

A glass sheet P is placed on the table 27. Once the glass positioning pad driving rod 25 fixed on the machine body 1 is put down, the glass positioning pad 26 presses tightly on the glass sheet P. With a control handle 2 is coaxially connected to the synchronizing wheel 10 and the rear gear 17, when the control handle 2 fixed on the machine body 1 is forced to rotate forward by means of an operator's hand, the synchronizing wheel 10 and the rear gear 17 begin to rotate. The rear gear 17 can drive the rear gear 18 to rotate as a result from their engagement with each other. The rear gear 18 is coaxially connected to the synchronizing wheel 11. The synchronizing wheel 8 can be rotated by means of the synchronizing wheel 11 via the timing chain 31. Similarly, the synchronizing wheel 12 can be driven to rotate by means of the timing chain 32. The synchronizing wheels 8 and 9 are coaxially connected to each other. The synchronizing wheels 12 and 13 are also coaxially connected to each other. The synchronizing wheels 7, 14 are driven to rotate by means of the synchronizing wheels 9, 13 via timing chains 30, 33, respectively. In addition, the synchronizing wheels 7, 14 are coaxially connected to the front gears 5 and 6, respectively. As a result, the diamond glass drilling bits 36 and 37 can be moved to be near to each other. Once the motors 23 and 24 are connected with power source, the diamond glass drilling bits 36 and 37 are driven to rotate with the power of the motors 23 and 24, so as to drill the glass sheet positioned on the table from the opposite sides of the glass sheet. At the same time, the cooling liquid supplying means 38 and 39 supply the cooling liquid to the hole being drilled on the glass sheet. After the hole drilling, the motors can be turned off.

As stated above, in the preferred embodiment of the present invention, the rigid and fragile material drilling machine comprises:

a machine body 1, which supports the whole drilling machine, a table and associated holding means, which includes a table 27, a glass positioning pad 26, and a glass positioning pad driving rod 25, a glass sheet drilling means, which includes drilling bit holders 34 and 35, drilling bits 36 and 37, and cooling liquid supplying means 38 and 39, a motor and associated power transmitting means, which includes motors 23 and 24, belt pulleys 20 and 22, driving belts 28 and 29, belt pulleys 19 and 21, and drilling rods 15 and 16, and a driving means for driving the upper and lower drilling bits approximating the glass sheet, which includes a control handle 2, upper and lower rear gears 17 and 18 and upper and lower first synchronizing wheels 10 and 11 being coaxially connected with the upper and lower rear gears 17 and 18, upper and lower first timing chains 31 and 32, upper and lower second synchronizing wheels 8, 12 and upper and lower third synchronizing wheels 9, 13 being coaxially connected with each other respectively, upper and lower second timing chains 30 and 33, upper and lower fourth synchronizing wheels 7, 14 and upper and lower front gears 5, 6 being coaxially connected with each other respectively, and drilling rod guiding sleeves 3 and 4.

Those skilled in the art can appreciate that the rigid and fragile material drilling machine according to the present invention can also be used to drill holes at preset locations on ceramic plate, crystal wafer, or rigid plastics, etc.

What is claimed is:

1. A rigid and fragile material drilling machine, characterized in that driving means for driving the upper and lower drilling bits on opposite sides of the rigid and fragile material includes a control handle (2) being able to be operated to turn around;

upper and lower rear gears and associated upper and lower first synchronizing wheels (17,18;10,11), said upper and lower rear gears (17,18) being coaxially connected to said associated tipper and lower first synchronizing wheels (10,11), one of said upper and lower first synchronizing wheels (10,11) being driven to rotate by means of said control handle (2), said upper and lower rear gears (17,18) being engaged with each other, and the radii of said upper and lower rear gears (17,18) being greater than those of said upper and lower first synchronizing wheels (10,11);

upper and lower second synchronizing wheels (8,12) and upper and lower third synchronizing wheels (9,13), being provided above and below said upper and lower rear gears and associated upper and lower first synchronizing wheels (17,18;10,11), respectively, and said upper and lower second synchronizing wheels (8,12) and said upper and lower third synchronizing wheels (9,13) being coaxially connected with each other respectively;

upper and lower first timing chains (31,32), being wound around said upper and lower first synchronizing wheels (10,11) and upper and lower second synchronizing wheels (8,12), respectively;

upper and lower fourth synchronizing wheels and upper and tower front gears (7,14,5,6), being provided on one side of said upper and lower second synchronizing wheels (8,12) and said upper and lower third synchronizing wheels (9,13), said upper and lower fourth synchronizing wheels (7,14) and said upper and lower front gears (5,6) being coaxially connected with each other, respectively, and the radii of said upper and lower fourth synchronizing wheels (7,14) being less than those of said upper and lower front gears (5,6), respectively;

upper and lower second timing chains (30,33), being wound around said upper and lower third synchronizing wheels (9,13) and upper and lower fourth synchronizing wheels (7,14), respectively; and drilling rod guiding sleeves (3,4), gear racks thereof being engaged with said upper and lower front gears (5,6), respectively.

2. A rigid and fragile material drilling machine as claimed in claim 1, characterized in that, said upper and lower second synchronizing wheels (8,12) and said upper and lower third synchronizing wheels (9,13) being provided upward and downward with respect to said upper and lower rear gears and associated tipper and lower first synchronizing wheels (17,18,5,6), respectively.

3. A rigid and fragile material drilling machine as claimed in claim 1, characterized in that, the axes of said upper and lower fourth synchronizing wheels and upper and lower front gears (7,14,5,6) are provided at the same height as said upper and lower second synchronizing wheels (8,12) and said upper and lower third synchronizing wheels (9,13).

4. A rigid and, fragile material drilling machine as claimed in claim 1, characterized in that, bearings are provided within said drilling rod guiding sleeves (3,4).

5. A rigid and fragile material drilling machine as claimed in claim 1, characterized in that, the gear racks of said drilling rod guiding sleeves (3,4) are integral with or fixed to said drilling rod guiding sleeves (3,4).

6. A rigid and fragile material drilling machine as claimed in claim 1, characterized in that, the rigid and fragile material is glass.

* * * * *